(No Model.)  
5 Sheets—Sheet 3.
H. J. BRAUER.
MACHINE FOR MAKING BOOK COVERS.
No. 565,832. Patented Aug. 11, 1896.
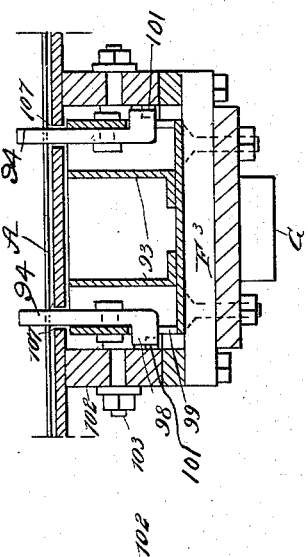
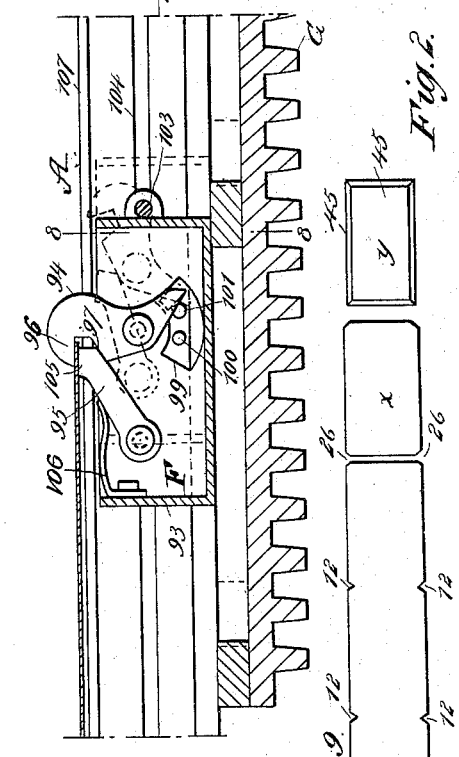
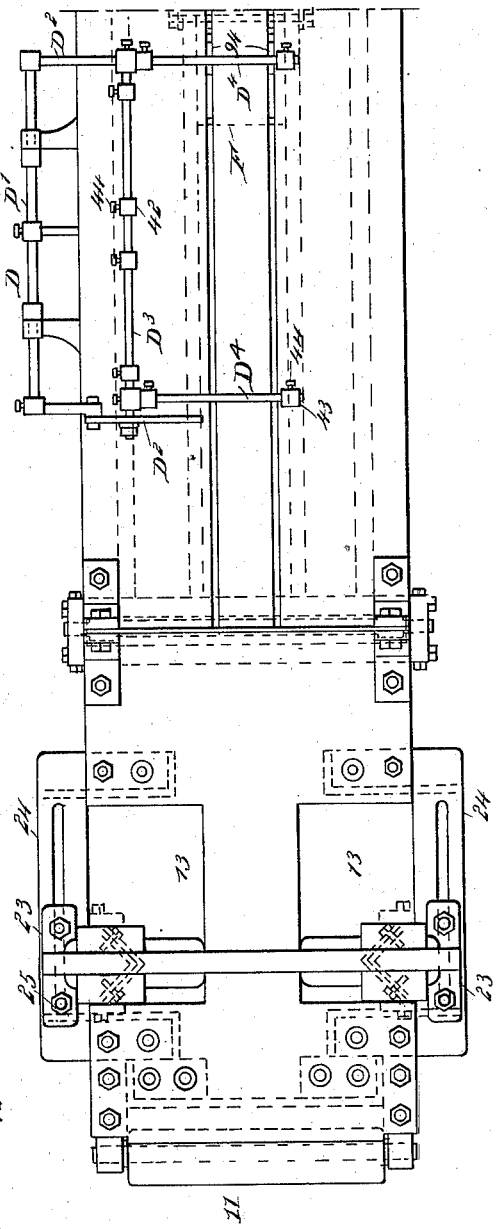
WITNESSES:
Donn Turtchell
C. R. Ferguson
INVENTOR
H. J. Brauer
BY
Munn & Co.
ATTORNEYS.

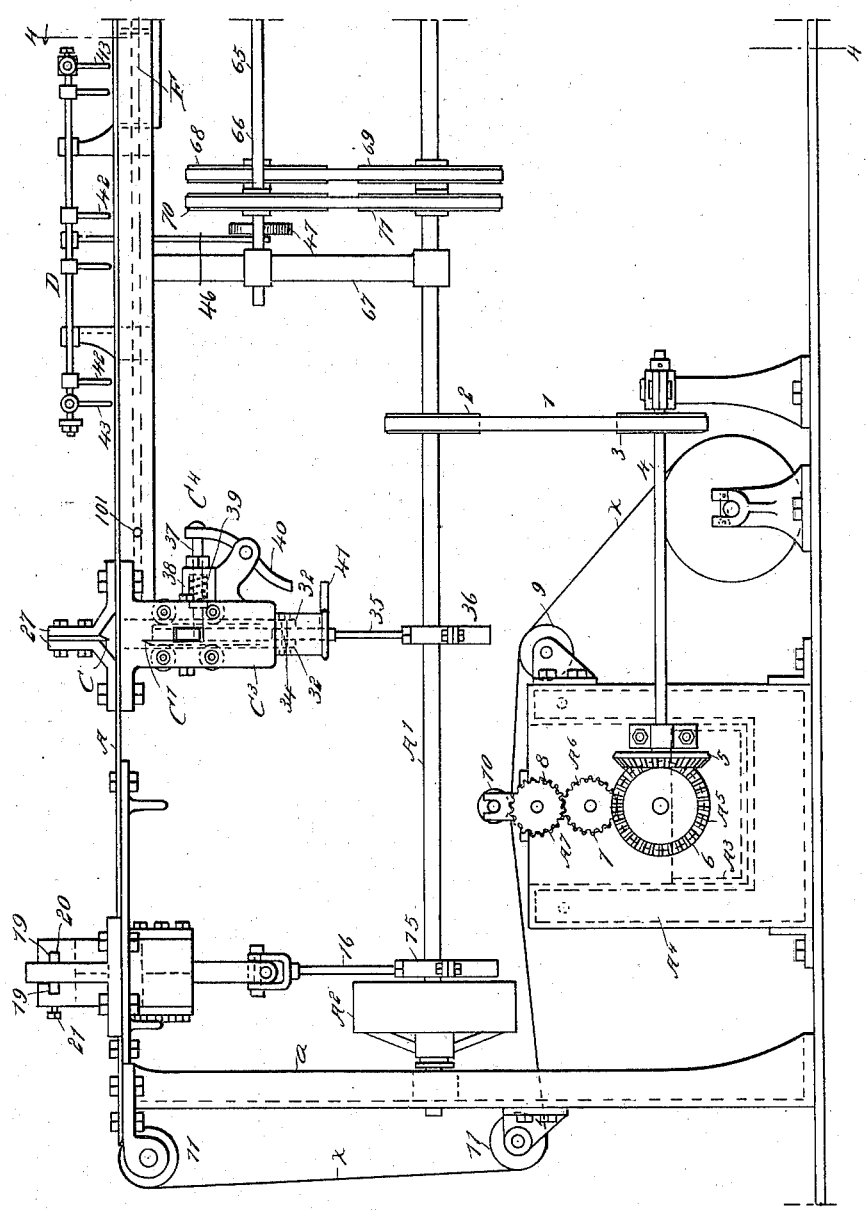

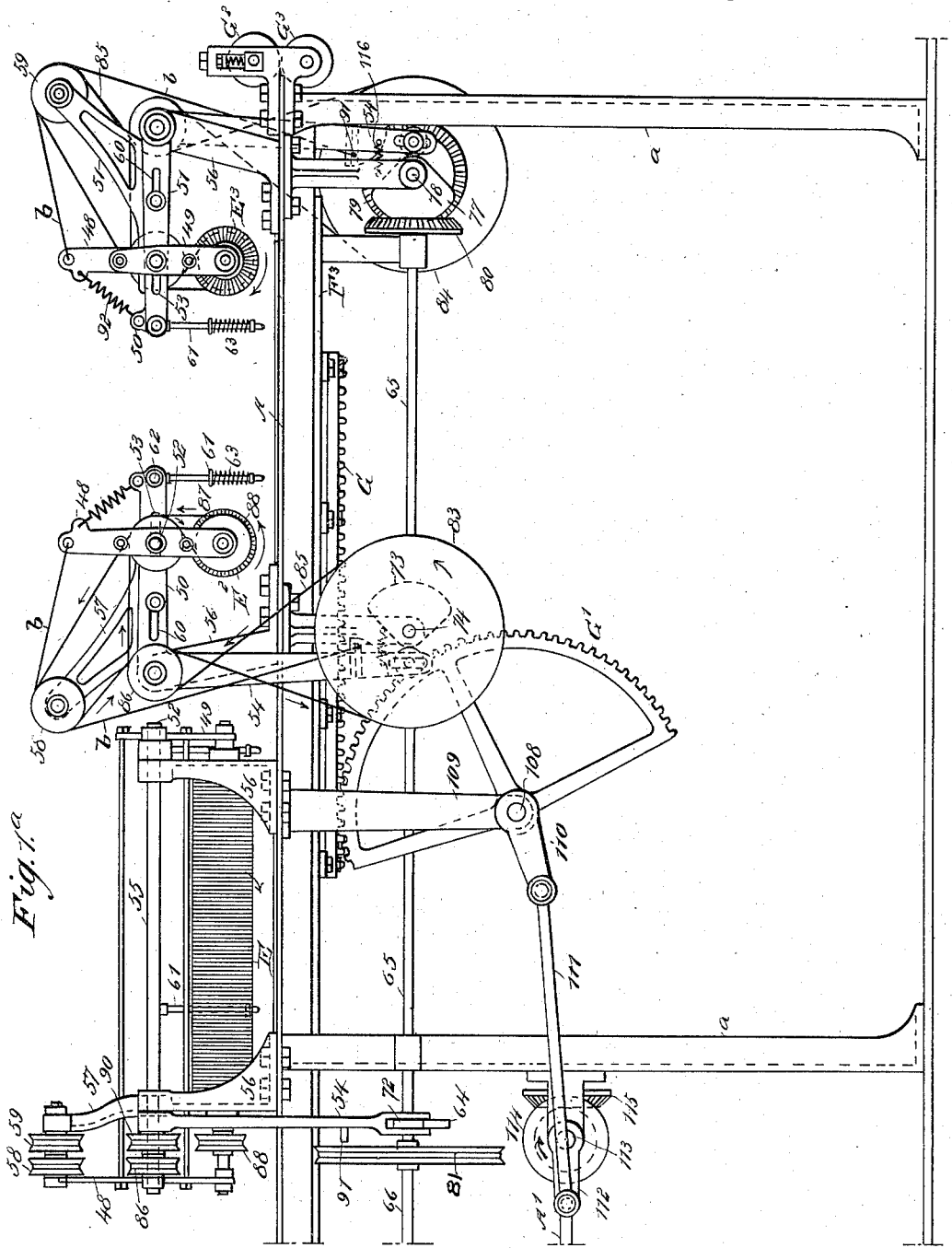

(No Model.) 5 Sheets—Sheet 4.
H. J. BRAUER.
MACHINE FOR MAKING BOOK COVERS.
No. 565,832. Patented Aug. 11, 1896.
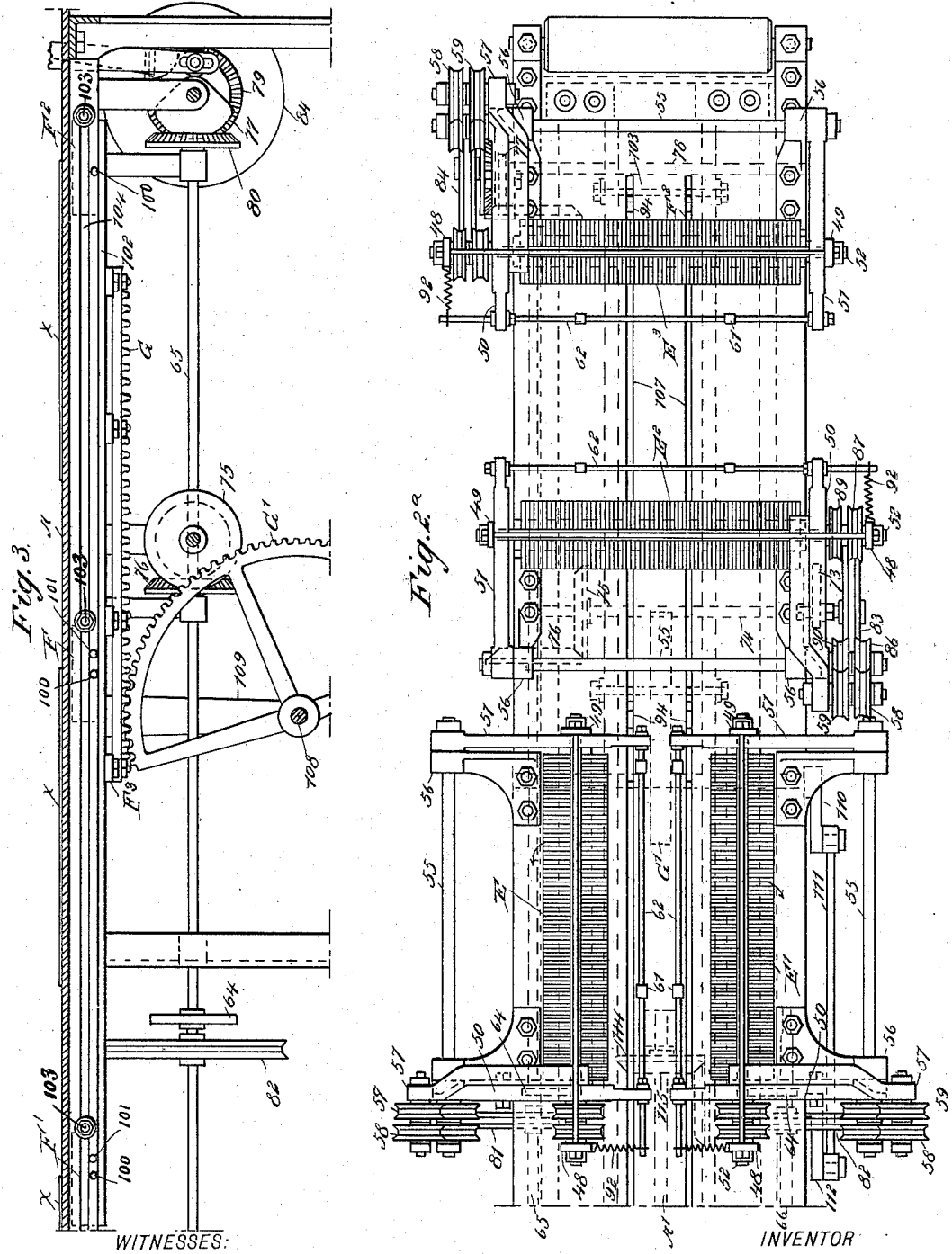
WITNESSES:
INVENTOR
BY
ATTORNEYS.

(No Model.) 5 Sheets—Sheet 5.
H. J. BRAUER.
MACHINE FOR MAKING BOOK COVERS.
No. 565,832. Patented Aug. 11, 1896.
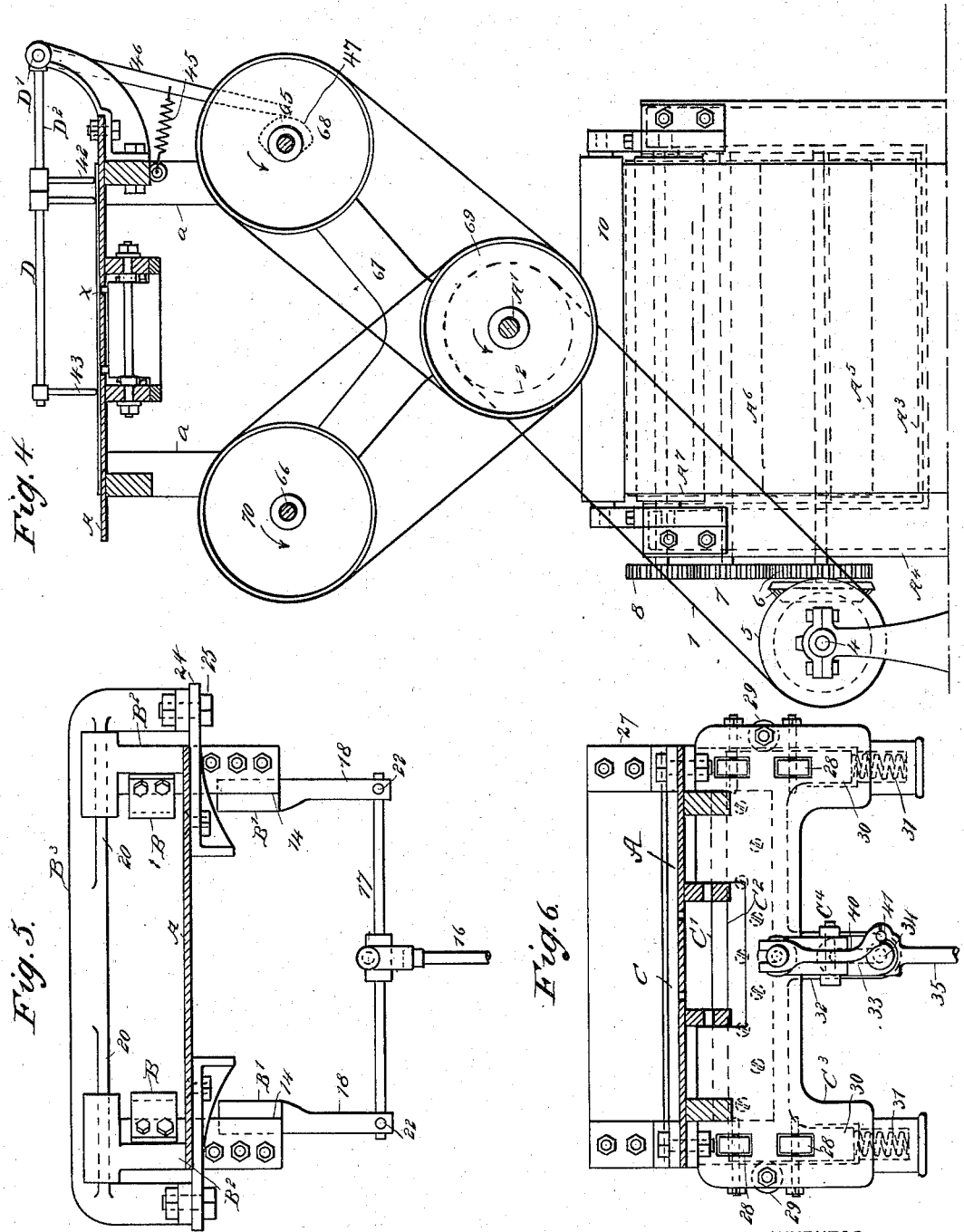
WITNESSES:
Donn Twitchell
C. R. Ferguson
INVENTOR
H. J. Brauer
BY Munn & Co.
ATTORNEYS.

UNITED STATES PATENT OFFICE.

HENRY J. BRAUER, OF NEW ORLEANS, LOUISIANA.

MACHINE FOR MAKING BOOK-COVERS.

SPECIFICATION forming part of Letters Patent No. 565,832, dated August 11, 1896.

Application filed June 12, 1895. Serial No. 552,568. (No model.)

*To all whom it may concern:*

Be it known that I, HENRY J. BRAUER, of New Orleans, in the parish of Orleans and State of Louisiana, have invented certain new and useful Improvements in Machines for Making Book-Covers, of which the following is a specification.

This invention relates to machines for placing a cloth, paper, or similar material on paper-board used as book-covers, and the object is to provide a practically automatic machine for this purpose, having certain parts adjustable, so that the machine may be accommodated to different sizes of covers.

With these ends in view, the invention consists in means for applying an adhesive to the cloth or similar material, and, further, in means for carrying the cloth forward, cutting it in desired places, placing it on a suitable base-board, and, finally, ejecting it in a finished condition.

It further consists in the construction and novel arrangement of parts, as will be fully described, and then pointed out in the appended claims.

Reference is to be had to the accompanying drawings, forming a part of this specification, and in which similar characters of reference indicate corresponding parts in all the figures.

Figures 1 and $1^a$ show side elevations of a machine embodying my invention. Figs. 2 and $2^a$ show top or plan views of the machine. Fig. 3 is a partial section and partial elevation, drawn on an enlarged scale, showing a mechanism for carrying certain grippers employed. Fig. 4 is a transverse section of the machine on the line 4 4 of Fig. 1, with certain parts omitted. Fig. 5 is a front elevation of a certain cutter mechanism employed. Fig. 6 is a front elevation of another cutter mechanism employed. Fig. 7 is a longitudinal section of a portion of the machine, showing a gripper in side elevation. Fig. 8 is a transverse section thereof, and Fig. 9 is a plan view showing the work of the machine at different stages.

Referring by reference-characters to the drawings, A designates the bed or table of the machine, supported by suitable framework, such as $a$. The framework also serves to support certain operating parts, as will hereinafter more fully appear.

$A'$ is the main driving-shaft, having bearings in the framework, and having a friction or other clutch connection with a band-pulley $A^2$, mounted loosely on said shaft and receiving power from any desired source.

I will now describe a mechanism for applying an adhesive material, such, for instance, as glue, to the covering cloth or material $x$ previous to its delivery to the machine.

$A^3$ designates the glue pot or pan, located within a hot-water, steam, or other heating-jacket $A^4$. Within the adhesive-receptacle the glue take-up roller $A^5$ rotates. This take-up roller contacts with a distributing-roller $A^6$, which contacts with the spreading-roller $A^7$, designed to spread the adhesive material evenly over the surface of the cloth $x$.

The several rollers just described may be made of any suitable material, such, for instance, as rubber, a textile, or fiber. They have suitable journal-bearings in opposite walls of the jacket or casing $A^4$, and rotary motion is imparted to them from the main shaft $A'$ through the medium of a band 1, passing over a pulley 2 on the main shaft and around a pulley 3 on a shaft 4, carrying a bevel-gear 5, meshing with a gear 6 on the extended journal of the roller $A^5$, a gear 7 on the extended journal of the roller $A^6$, meshing with the gear 6, and a gear-wheel 8 on the extended journal of the roller $A^7$, meshing with the gear-wheel 7. The material $x$ is carried from its roll over roller 9, journaled in bearings extended from the jacket $A^4$, thence over the spreading-roller $A^7$, beneath a pressure-roller 10, which serves to hold the material in close contact with the spreading-roller, and thence around rollers 11, journaled at the rear end of the machine to the top of the bed or table A, to be operated upon by certain cutters and finishing devices, as will now be described.

B and B' indicate pairs of corner-cutters, one pair being located directly opposite the other pair. The cutters are substantially V-shaped, as plainly indicated in Fig. 2, and they are designed to cut correspondingly-shaped notches in the opposite edges of the material $x$, as shown at 12, in Fig. 9.

The cutters B are fixedly attached by bolts or otherwise to hangers $B^2$, depending from a bar $B^3$, extended above and across the bed A of the machine. The cutters B are arranged with their cutting-edges slightly above the bed A, and the hangers $B^2$ are extended downward through openings 13 in the bed A. The lower portions of the hangers $B^2$ are provided with guideways 14, with which the cutters B' engage and upon which they are reciprocated vertically. A vertical reciprocating motion is imparted from the main shaft A' by means of an eccentric mechanism 15 on said shaft, and the eccentric-rod 16, having swinging connection with a rod 17, which extends through openings in the depending shanks 18 of the cutters B'.

To accommodate the pairs of cutters just described to varying widths and lengths of work, I provide means for adjusting them transversely or toward each other and also lengthwise of the machine. For the transverse adjustment the upper ends of the hangers $B^2$ are provided with horizontal channels 19, which engage over laterally-projecting ribs or ways 20 on the bar $B^3$. Obviously the pairs of cutters may be adjusted toward or from each other by moving the hangers along the ways 20, and the adjustment may be secured by means of set-screws 21. The openings in the depending shanks 18 of the cutters B' are sufficiently large to allow an easy movement of said cutters for adjustment along the rod 17, and set-screws 22 are provided to hold the rod 17 rigidly with relation to the cutters B' after they shall have been adjusted.

As a means for adjusting the corner-cutters above described lengthwise of the bed A or relatively to a transverse cutter that will next be described, the downwardly-extending portions of the bar $B^3$ are provided with lateral extensions or plates 23, adapted to slide upon longitudinally-slotted plates 24, extended outward from the bed-plate A of the machine. Set-bolts 25 pass through holes in the parts 23 and through the slots in the plates 24. By this construction the corner-cutters may be adjusted longitudinally of the machine and clamped as adjusted. The openings 13 in the bed-plate A, it will be seen, are large enough to permit of these two adjustments.

C C' designate, respectively, the top and bottom transverse cutters or shears. These cutters C C' are designed to cut the material $x$ transversely from the inner end of one notch 12 to the inner end of the opposite notch 12, and thus form angle-corners to the severed piece, as indicated at 26, in Fig. 9.

The cutter C is rigidly attached to brackets 27 extended upward from the bed A, and is therefore stationary, with its cutting-edge slightly above the bed A.

As the main shaft A' has a slow motion comparatively to the mechanisms for moving material severed by the cutters C C', I provide means independent of the shaft A' for moving the blade or cutter C' rapidly upward or on its cutting stroke, it being understood that the cutter is released for its upward movement and drawn downward by connections with the main shaft. The cutter C' is secured to a carrier-plate $C^2$ by suitable screws, and this carrier-plate is movable vertically within a housing $C^3$, secured to and depending from the bed A. The plate moves against side and antifriction-rollers 28 and end antifriction-rollers 29, journaled in the walls of the housing. The plate $C^2$ has at each end downwardly-extended portions 30, which bear upon spiral springs 31, having their lower ends abutting against the inner bottom walls of tubular downward projections from the housing $C^3$. Intermediate of its ends the carrier $C^2$ has depending arms 32, which are provided with vertical slots 33, through which the bolt 34 at the upper end of the eccentric-rod 35 passes. This eccentric-rod 35 has an eccentric connection 36 with the main shaft A' and is operated thereby.

$C^4$ is a locking and releasing mechanism for the carrier $C^2$. It comprises a bolt 37, movable through a boxing 38 on the housing $C^3$ through an aperture in the wall of the housing and into a hole in the carrier $C^2$. The bolt is impelled inward to a locking engagement with the carrier by means of a spring 39, bearing at one end against the inner end wall of the boxing and at the other end against an annular shoulder or collar on the bolt.

A downwardly and rearwardly curved lever 40 is fulcrumed between its ends to lugs extended from the housing $C^3$. The upper bifurcated end of the lever 40 embraces the bolt 37 and bears against the inner side of its head, and its lower end is extended into the line of movement of a pin 41, carried by the eccentric-rod 35.

The operation of this mechanism is as follows: As the eccentric-rod 35 moves upward no motion is imparted by it to the carrier $C^2$, because of the bolt 34 moving through the slots 33. During this upward movement, however, the pin 41 strikes against the lever 40 and rocks it to withdraw the bolt 37. When the eccentric-rod bolt shall have reached the upper end of the slots 33, the lever 40 will be sufficiently rocked to draw the bolt out of its engagement with the carrier $C^2$. Then the springs 31 will force the carrier and its cutter-blade upward with great rapidity, and thus the cutter C', in conjunction with the cutter C, will sever the material $x$ in the manner before described. At the end of this upward or cutting movement the lower end walls of the slots 33 will be in contact with the eccentric-rod bolt, and of course the downward movement of the eccentric-rod will draw the carrier and cutter C' downward, and the mechanism will operate through the medium of the spring 39 to lock the carrier. After the cutting operation by the cutters C C' the severed piece of material $x$ will be moved by grippers, hereinafter to be described, to a gage D, into which the stiffening-boards for the covers are fed. This gage D comprises a shaft D', extended lengthwise of the bed A, and having bearings in blocks extended laterally and upward from said bed, and arms D² project from the shaft D' over the bed A. D³ is a rod secured to and adjustable longitudinally of the arms D², and D⁴ are arms extended at right angles from the rod D³ and adjustable longitudinally thereof. Bearing-fingers 42 extend downward from the rod D³, and similar fingers 43 depend from the arms D⁴. These several fingers are adjustable longitudinally of their respective supports and may be held as adjusted by set-screws 44.

In operation the several gage-fingers are set to encompass and bear slightly against three edges of the stiffening-board and bear at their ends upon the materal $x$ to be attached to the board. It is obvious that the material $x$ has a somewhat larger area than the board, so as to allow its edges to be turned over the edges of the board $y$, as indicated at 45 in Fig. 9. After a stiffening-board shall have been fed into the gage D and upon the covering material the fingers are raised therefrom by tilting the gage-frame upward by means of a spring 45, secured at one end to a fixed part of the machine and at the other end to a lever 46, depending from the shaft D. Opposite movement is imparted to the gage against the resistance of the spring 45 by means of a cam 47 on a side shaft engaging with the end of the lever 46 or a projection therefrom. From the gage D the cover is moved by grippers, to be described, to rotary brushes designed to turn the head and tail edges of the material $x$ over the corresponding edges of the stiffening-board, and then to similar brushes which turn over the side edges of the material.

As the several brushes and their appurtenances, excepting the arrangement of their driving-gear, are alike, I will describe them conjointly.

E E' designate the head and tail brushes, and E² E³ the side brushes. The brushes E E' are arranged opposite each other and extend lengthwise of the machine, and the brushes E² E³ are arranged opposite each other and extend transversely of the machine. Each brush has journal connections with swinging hangers 48 49 depending from rock-arms 50 51. The hangers 48 49 are connected to the arms 50 51 by means of rods 52, which extend lengthwise of the brushes through longitudinal slots 53 in the arms. The arms 50 are made in the form of angle-levers and their vertical portions 54 extend below the bed A, where they are operated upon by mechanism to be described for rocking the parts to bring the brushes into engagement with the work. The arms are rigidly mounted on shafts 55, having pivotal bearings in brackets 56, extended upward from the bed of the machine. Brackets 57 extend upward from the arms 50 and have grooved idler-pulleys 58 59 journaled on studs extended from the upper ends of the brackets, the purpose of which will be hereinafter explained. The brackets 57 are adjustable longitudinally of the arms 50, so that the axes of the idlers 58 59 may be changed or adjusted relatively to the fulcrum 55 of the arms. With this end in view I provide each arm 50 with a longitudinal slot 60 through which a set-bolt may pass from the bracket.

61 designates bearing-fingers designed to engage at their ends with the work and hold it firmly on the bed A during the operation of the brushes. The bearing-fingers depend from rods 62, attached to the outer ends of the arms 50 51. The bearing-fingers are designed to reach the work prior to the brushes; therefore, their lower ends are normally below the lower plane of the brushes. In order that the fingers will not interfere with the downward movement of the brushes, I so construct them as to yield longitudinally. A convenient construction for this purpose will be to form each finger of two telescopic sections, with a spiral spring 63 interposed between abutments on the respective sections.

I will now describe means for rocking the arms 50 51 for bringing the presser-fingers and brushes down to the work. The brushes E E' are rocked by cams 64 on side shafts 65 66, respectively. These shafts 65 66 have their rear journal-bearings in a hanger 67, which also serves as an intermediate support for the main shaft A', as plainly indicated in Figs. 1 and 4. Rotary motion is imparted to the shaft 65 by means of a band connection from a band-wheel 68 on said shaft to a band-wheel 69 on the shaft A', and the shaft 66 is rotated by a band connection between a band-wheel 70 on said shaft and a band-wheel 71 on the main shaft. Antifriction-rollers 72 are journaled in the lower ends of the portions 54 of the angle levers or arms supporting the brushes E E', and these rollers bear against the cams 64 on the respective side shafts 65 66. Obviously the cams operating against the antifriction-rollers will impart a rocking motion to the arms 50 51, and consequently force the brushes down. The downward rocking motion is imparted to the brush E² and its appendages by means of a cam 73, mounted on a transverse shaft 74, which receives motion from the side shaft 65 through the medium of bevel-gears 75 76, mounted on the respective shafts. This cam 73 operates against an antifriction-roller at the end of the lever-arm 54 in the manner heretofore described in connection with the brushes E E'. A similar motion is imparted to the brush E³ and its appurtenances by means of a cam 77 on a transverse shaft 78, which receives motion through the medium of bevel-gear 79 80 on the respective shafts.

I will now describe the means for imparting rotary motion to the brushes E E' E² E³. The brushes and their parts are returned to their normal position by means of springs 116, secured at one end to the arm 54 and at the other end to a hanger or fixed portion of the machine. Primarily rotary motion is imparted to the brush E by a band connection with a grooved wheel 81 on the shaft 65, to the brush E' from a similar wheel 82 on the shaft 66, to the brush E² from a similar wheel 83 on the shaft 74, and to the brush E³ from a similar wheel 84 on the shaft 78. The band connection 85 is the same in each case, and extends from the main grooved wheel over an idler 86, thence over a pulley 87, thence around the pulley 88 on the brush-shaft, thence to an idler 89, thence to the idler 59, thence to the idler 90, and back to the main wheel. The course of the band is indicated by arrows adjacent to the band for the transverse brush nearest the longitudinal brushes. It is desired to impart in connection with the rotary motion a forward or sweeping motion to the brushes as they contact with the work. For this purpose I extend a flexible connection $b$, such as a cord, from a pin 91 on the lower end of the arm 54 over the idler 58 to a connection with the upper end of the hanger 48. By this arrangement, when a brush is forced downward to its work, the connection $b$ will rock the hangers so as to impart a forward or sweeping motion to the brush. As the parts return to their upward normal position a spring 92, fastened at one end to the hanger 48 and at the other to the rod 62, will restore the hangers to a vertical position.

I will now describe the grippers heretofore mentioned for carrying the work along. It will be observed that there are three sets of grippers, each set consisting of two grippers arranged side by side. The pairs of grippers have a fixed relation, one pair relatively to another pair, as indicated at F F' F², in Figs. 2, 2ª, and 3, and each pair is mounted in a boxing 93, and the boxing is secured to a carriage F³, having a reciprocating movement below the bed A and longitudinally thereof.

Referring to the enlarged views, Figs. 7 and 8, each gripper consists of two members 94 95. The member 94 is fulcrumed intermediate of its ends to the outer side wall of the boxing 93, and at its upper end it has a gripping surface or jaw 96, adapted to engage the upper side edge of the work to be moved along. Below and in line with the surface 96 it has an incline or cam surface 97, upon which the member 95 is designed to ride, to be forced into engagement with the under side edge of the work. At its lower end the section 94 has a lateral projection 98 extended through an aperture 99 in the outer wall of the boxing and adapted to engage with pins 100 101, extended from a guide-rail 102, secured to the under side of the bed A, and which support and serve as ways for the carriage F³, the said carriage being supported by means of bolts or rods 103, extended through lugs on the boxes 93 and through slots 104 in the guide-rails. The section 95 has a gripper or jaw end 105, and has a pivotal connection at its opposite end to the outer side wall of the boxing. The section 95 is held in yielding connection with the adjacent edge of the section 94 by means of a spring 106.

The bed A of the machine is provided with longitudinal slots 107, through which the upper portions of the gripper-sections 94 may be projected. It is to be understood that these upper portions project through the slots while the work is carried along, as shown in full lines in Figs. 7 and 8, but when the grippers are returning for more work the said sections 94 are entirely below the bed A, as indicated in dotted lines, Fig. 7. It is further to be understood that the pair of grippers F move the work from the cutters C C' to the gage D, that the pair of grippers F' move the work from the gage D to the brushes E E', and that the pair of grippers F² move the work from the brushes E E' to the brushes E² E³. The movement of the carriage F³ is sufficiently far to carry the pair of grippers F beneath the cutter C.

The operation of the grippers is as follows: The grippers are moved along beneath the bed A toward the work to be gripped and as they reach the end of their journey the lateral projection on the lower end of the sections 94 will engage with pins 101 and move the sections through the slots 107 to engage the upper side of the work and the sections 95 will be moved into engagement with the under side of the work. On their return movement the projections on the sections 94 will engage with pins 100 and rock the grippers out of engagement with the work.

I will now describe the mechanism for reciprocating the carriage F³.

G is a rack-bar secured to the under side of the carriage F³, engaged by a segment-rack G', mounted on a shaft 108, having bearings in hangers 109, attached to the under side of the bed A. On a projected end of the shaft 108 is a crank 110, from which a pitman 111 extends to a crank 112 on transverse shaft 113, which has a bevel-gear 114 at its inner end meshing with a bevel-gear 115 on the main shaft A'.

G² G³ designate pressure and finishing rollers, between which the work is forced, after being operated by the brushes E² E³, by the projecting ends of the pair of grippers F² as they approach with more work for the brushes E² E³. These rollers G² G³ serve to press the connected parts $x$ $y$ firmly and smoothly together and to eject the finished work into a suitable receptacle.

As a description of the operation of the several parts has been carried on successively, it is thought a further description of the operation will not be necessary.

It will be seen from the foregoing that the operation of the machine is automatic in all its parts excepting the feeding of the stiffening-boards to the gage, which is done manually. The machine may be attended and operated by one person, who need not be a skilled mechanic.

In practice I number correspondingly the several adjustable parts, so that adjustments for a given size of work may be quickly and accurately made.

The machine will turn out a better and more finished cover than can be done by hand-work, because the cloth is evenly glued and the brushes turn the edges down more firmly than can be done by hand.

Having thus described my invention, I claim as new and desire to secure by Letters Patent—

1. A machine for making book-covers, comprising a succession of mechanisms for applying an adhesive to a cover material, corner-cutters for the material, severing-cutters, an automatic locking and releasing mechanism for one of the severing-cutters means for directing a stiffening-board to the material, means for turning the edges of the material over the stiffening-board, yielding fingers for holding the board while the edge-turners are operating and means for pressing and finishing the cover, substantially as specified.

2. A machine for making book-covers, comprising means for applying an adhesive to a cover material, corner-cutters for the material, severing-cutters, automatic locking and releasing mechanism for one of said cutters a gage for directing a stiffening-board onto the material, brushes operating to wholly turn the edges of the material over the stiffening-board, and mechanism for imparting a swinging motion to the brushes substantially as specified.

3. A machine for making book-covers, comprising an adhesive-applying mechanism for a cover material, corner-cutters, a severing-cutter, automatic locking and releasing mechanism for said severing-cutter a gage for directing a stiffening-board onto the material, brushes for completely turning the edges of the material over the stiffening-board, mechanism for imparting a swinging motion to the brushes and mechanism for moving the work from the place of one operation to the place of another operation, substantially as specified.

4. A machine for making book-covers, comprising mechanism for applying an adhesive to a cover material, corner-cutters, severing-cutters, automatic locking and releasing mechanism for one of said severing-cutters means for directing a stiffening-board onto the material, rotary brushes for lifting and turning the edges of the material over the stiffening-board, mechanism for imparting a sweeping or swinging motion to the brushes and automatic grippers for moving the work to successive places of operation, substantially as specified.

5. In a machine of the class described, the combination with the bed-plate, of a bar supported by and adjustable longitudinally of the bed-plate, hangers supported by and adjustable longitudinally of the bar, stationary corner-cutters on said hangers, and cutters movable in said hangers and coacting with the stationary cutters, substantially as specified.

6. In a machine of the class described, the combination with the bed-plate, of a severing-cutter, comprising a cutter fixed above the bed-plate, a spring-impelled cutter coacting with the fixed cutter, and an automatic locking and releasing mechanism for the spring-impelled cutter, substantially as specified.

7. In a machine for making book-covers, the combination with a bed-plate and driving mechanism, of a severing-cutter comprising a blade fixedly supported above the bed-plate, and a coacting vertically-movable blade, a locking mechanism for the movable blade, means for impelling the movable blade upward after being released, and means, connected with the main shaft, for operating the releasing mechanism, substantially as specified.

8. In a machine of the class described, the combination with a main shaft, of a corner-cutter operated from the main shaft, and a severing-cutter operated from the main shaft, automatic locking and releasing mechanism for one of the severing-cutters the said cutters being on separate frames and adjustable one relatively to the other, substantially as specified.

9. In a machine of the class described, the combination with a main shaft, a corner-cutter, and a severing-cutter, of a gage for directing a stiffening-board to a severed piece of cover material received from the severing-cutter, substantially as specified.

10. In a machine of the class described, the combination with a bed-plate and driving mechanism, of corner-cutters, severing-cutters and a gage over the bed-plate, for directing a stiffening-board to a severed piece of cover material received from the severing-cutter comprising a vertically-swinging frame, and fingers adjustable on said frame, the said gage being movable away from the bed-plate by the driving mechanism, substantially as specified.

11. In a book-cover machine, the combination with a bed or support and driving mechanism, of corner-cutters, a severing-cutter mechanism for automatically locking and releasing the cutter, pairs of brushes, one pair operating at right angles to the other pair, and mechanism comprising grippers movable under the machine-bed for moving work from the severing-cutter to the brushes, substantially as specified.

12. In a book-cover machine, the three sets or pairs of grippers, each comprising two coacting jaw-sections, one jaw being operated by the other one of said sections having a projection to engage against a fixed part for operating the sections, and a carriage with which all of the grippers are movable substantially as specified.

13. The combination, with a bed-plate provided with longitudinal slots, of grippers, each consisting of two sections one of said sections being movable through a slot in the bed-plate and the other section having a spring-pressed engagement with the section movable through the slot, and an automatically-movable carriage on which said grippers are mounted, substantially as specified.

14. The combination with rotary brushes supported on rock-arms, of vertically-yielding presser-fingers supported by said arms, substantially as specified.

15. The combination of brushes, rock-arms for supporting the brushes, mechanism for imparting a rotary motion to said brushes, mechanism for imparting a sweeping motion to said brushes, and the vertically-yielding presser-fingers supported by the arms, substantially as specified.

HENRY J. BRAUER.

Witnesses:
G. W. HILL,
LOUIS BETZER, Jr.